3,408,401
PRODUCTION OF UNSATURATED
ALIPHATIC ALDEHYDES
William John Ball, Capel, near Dorking, John Lynn Barclay, Tadworth, Edward James Gasson and David Gordon Stewart, Epsom, John Bohemen, Sutton, Frank Christopher Newman, Great Bookham, and Barrie Wood, Epsom, England, assignors to The Distillers Company Limited, Edinburgh, Scotland, a British company
No Drawing. Original application July 20, 1964, Ser. No. 383,958. Divided and this application June 14, 1966, Ser. No. 567,325
Claims priority, application Great Britain, July 30, 1963, 30,087/63; Apr. 1, 1964, 26,260/64, 13,510/64
4 Claims. (Cl. 260—604)

This is a division of application S.N. 383,958, filed July 20, 1964, now abandoned.

The present invention relates to catalytic compositions and in particular to catalytic compositions for use in oxidation reactions.

Accordingly the present invention is a catalytic composition suitable for catalysing the oxidation of hydrocarbons at an elevated temperature in the vapour phase which comprises an oxide composition containing antimony, tin, and uranium.

The present invention also includes within its scope processes for the oxidation of hydrocarbons at an elevated temperature in the vapour phase over the above defined catalyst. Such processes are for example the oxidation of propylene to acrolein, and isobutene to methacrolein, the conversion of proplyene or acrolein to acrylonitrile and of isobutene or methacrolein to methacrylonitrile in the presence of ammonia and molecular oxygen.

The oxide composition catalysts of the present invention may be regarded either as mixtures of antimony, tin and uranium oxides or as oxygen-containing compounds of antimony, tin and uranium; under the reaction conditions the catalysts may contain either or both forms.

The proportions of the various components of the catalyst may vary within moderately wide limits. The atomic ratio of antimony/tin can be for instance from 1:10 to 10:1 and is preferably about 4:1. The amount of uranium present is not critical, and may vary for instance between about 0.1% and about 30% molar based on the total composition. Concentrations between 1 and 15% are particularly preferred.

The catalysts may be prepared in any suitable manner, for instance, by co-precipitation of the antimony, tin and uranium from a mixed aqueous solution of their soluble salts, for example the chlorides. In this case the precipitation is carried out by addition of ammonia. The precipitate is then thoroughly washed with water to remove soluble salts, for example ammonium chloride.

Alternatively, an antimony/tin oxide composition may first be prepared, and a uranium compound, for example an oxide or ammonium uranate subsequently incorporated. The antimony/tin oxide composition may be prepared by co-precipitation as before, or by intimately mixing one or more oxides of antimony, such as trioxide, tetroxide, or pentoxide, or a hydrated oxide, with one or more oxides of tin such as stannic oxide, stannous oxide or a hydrated oxide. Mixtures of the hydrated oxides, formed for example by the action of aqueous nitric acid on antimony and tin metals, or on mixtures of the metals, are preferred. The uranium may then be added to the mixture, for instance as an oxide or as an insoluble compound which is convertible to the oxide on heating. Examples of such insoluble neutral compounds are uranyl hydroxide and ammonium uranate.

Alternatively the uranium may be added to the antimony/tin oxide composition in the form of a water soluble salt, such as uranyl or uranium nitrate, formate, acetate, chloride or sulphate, and the mixture then evaporated to dryness or alternatively treated with a base such as ammonia urea or an amine to precipitate a uranium-containing compound.

After mixing the composition is preferably subjected to a heat treatment in the presence of oxygen, for instance in air at a temperature in the range 550° C. to 1100° C. and preferably between 700° and 850° C. The time of heating is not critical and may be, for example, from about 10 hours to about 40 hours.

The catalyst may, if desired, be deposited on supports such as pumice, silica, Carborundum or titania.

The reaction of propylene or isobutene with oxygen and ammonia over the catalyst may be carried out in any suitable manner, for instance as a fixed bed process in which the catalyst is used in the form of granules or pellets, or as a fluidised bed process, or as a moving bed process.

The unsaturated nitrile may be recovered from the reaction products in any suitable manner, for example by extractions with water, preferably at an acid pH, followed by fractional distillation. In one method the hot reaction gases are contacted firstly with an aqueous acidic solution which neutralises residual ammonia and extracts some of the nitrile, and secondly, with cold water to extract the remainder of the nitrile; the nitrile is subsequently recovered from the extracts by fractional distillation.

The processes for the preparation of the catalyst and for its use in various reactions are described further with reference to the following exampes.

Example 1

Uranyl chloride ($UO_2Cl_2$), 56.8 parts by weight, stannous chloride ($SnCl_2 2H_2O$), 37.6 parts by weight, and antimony trichloride ($SbCl_3$), 152.4 parts by weight, were dissolved in hydrochloride acid (59 parts by weight of acid, S.G.=1.18 and 100 parts by weight of water). The resulting solution was added dropwise to a stirred aqueous solution of ammonia (440 parts by weight of ammonia, S.G.=0.88, and 1000 parts by weight of water). The precipitate was filtered off, washed by resuspension in water (300 parts by weight), filtered, washed by resuspension in water (1000 parts by weight), filtered and dried at 110° C. The dried powder was formed into tablets and heated at 825° C. for 16 hours; the furnace temperature being raised from 300° C. to 825° C. at a rate of 20° C. per hour.

A mixture of propylene, air ammonia and steam in the ratios 5:55:6:34 by volume was passed over this catalyst at a temperature of 450° C. and a contact time (calculated at N.T.P.) of 4 seconds. Of the propylene fed, 61% was converted to acrylonitrile, 2% to acrolein and 4% to hydrogen cyanide. The yield of acrylonitrile on propylene to acrylonitrile consumed was 64%.

Example 2

59.3 parts of powdered tin was fed over a period of 10 minutes to a stirred mixture of 500 parts of water and 370 parts of concentrated nitric acid (68%) at 100°, 1420 parts of concentrated nitric acid (68%) was then added and the mixture heated to 103° C. 243.5 parts of powdered antimony was then introduced during 20 minutes, the mixture boiled for a further 7 minutes (111° C.) cooled to 40° C. and filtered. The solid was stirred with 1500 parts of cold water for 15 minutes, filtered then boiled with 2000 parts of water for one hour, cooled to 40° C., filtered and finally stirred with 1500 parts of cold water for 5 minutes.

A suspension of above oxide mixture containing 2 g. atoms of antimony and 0.5 g. atoms of tin was mixed with a solution of uranium oxide ($U_3O_8$, 0.125 g. atoms U) in 60% nitric acid at 70° C.

Dilute ammonia solution was added to the slurry until the pH rose to 6.5, when the precipitate was collected, washed well with distilled water and dried at 140° C. The dried powder was ground to −30 mesh; 1% by weight of graphite was added, and the mixture pelleted (3 mm.). The pellets were heat-treated in a stream of air at 925° for 16 hours, the temperature of furnace being raised from 250–925° C. at 20° per hour.

A feed of 10% propylene, 60% air, and 30% steam was passed over the catalyst at 473° C. and at a contact time of 4 seconds. Of the propylene fed, 45.7% was converted to acrolein, 9.5% to carbon dioxide, and 34.8% was recovered unchanged.

We claim:

1. A process for the production of acrolein from propylene or methacrolein from isobutene which comprises reacting said propylene or isobutene with oxygen in the vapor phase at an elevated temperature and in the presence of an oxide composition catalyst which contains antimony, tin and uranium.

2. The process of claim 1 wherein said temperature is in excess of about 400° C.

3. The process according to claim 1 wherein the atomic ratio of antimony to tin ranges from 1:10 to 10:1.

4. The process according to claim 1 wherein the uranium constitutes from 0.1% to 30% on the total weight of said catalyst.

References Cited

UNITED STATES PATENTS

| | | | |
|---|---|---|---|
| 3,198,750 | 8/1965 | Callahan et al. | 260—604 |
| 3,094,565 | 6/1963 | Bethell et al. | 260—604 |

FOREIGN PATENTS 588,908   12/1959   Canada.

LEON ZITVER, *Primary Examiner.*

R. H. LILES, *Assistant Examiner.*

UNITED STATES PATENT OFFICE
Certificate

Patent No. 3,408,401                                                  Patented October 29, 1968

William John Ball, John Lynn Barclay, Edward James Gasson, David Gordon Stewart, John Bohemen, Frank Christopher Newman and Barrie Wood Application having been jointly made by William John Ball, John Lynn Barclay, Edward James Gasson, David Gordon Stewart, John Bohemen, Frank Christopher Newman and Barrie Wood, the inventors named in the patent above identified, and The Distillers Company Limited, of Edinburgh, Scotland, a British Company, the assignee, for the issuance of a certificate under the provisions of Title 35, Section 256 of the United States Code, deleting the names of William John Ball, John Lynn Barclay, Edward James Gasson, and David Gordon Stewart from the patent as joint inventors, and a showing and proof of facts satisfying the requirements of the said section having been submitted, it is this 28th day of April 1970, certified that the name of the said William John Ball, John Lynn Barclay, Edward James Gasson, and David Gordon Stewart are hereby deleted from the said patent as joint inventors with the said John Bohemen, Frank Christopher Newman and Barrie Wood.

LUTRELLE F. PARKER
                                                                                        *Law Examiner.*